United States Patent
Kerrigan et al.

(10) Patent No.: US 10,572,207 B2
(45) Date of Patent: Feb. 25, 2020

(54) ON-GPU COMPOSITIONING OF GRAPHICAL DATA FROM MULTIPLE DOMAINS

(71) Applicant: Assured Information Security, Inc., Rome, NY (US)

(72) Inventors: Brendan Kerrigan, Rome, NY (US); Maurice Gale, Rome, NY (US); Rian Quinn, Highlands Ranch, CO (US); Rodney Forbes, Rome, NY (US); Sandy Stutsman, Westford, MA (US); Jonathan Farrell, Hauppauge, NY (US)

(73) Assignee: ASSURED INFORMATION SECURITY, INC., Rome, NY (US)

( * ) Notice: Subject to any disclaimer, the term of this patent is extended or adjusted under 35 U.S.C. 154(b) by 0 days.

(21) Appl. No.: 16/019,978

(22) Filed: Jun. 27, 2018

(65) Prior Publication Data
US 2020/0004488 A1 Jan. 2, 2020

(51) Int. Cl.
*G06F 3/14* (2006.01)
*G06T 1/20* (2006.01)
(Continued)

(52) U.S. Cl.
CPC ........... *G06F 3/1431* (2013.01); *G06F 9/451* (2018.02); *G06F 9/45558* (2013.01); *G06T 1/20* (2013.01);
(Continued)

(58) Field of Classification Search
None
See application file for complete search history.

(56) References Cited

U.S. PATENT DOCUMENTS 7,275,063 B2 * 9/2007 Horn ....................... G06F 16/22
8,069,435 B1 * 11/2011 Lai ......................... G06Q 10/10
717/106

(Continued)

OTHER PUBLICATIONS

Jukka Honkola, Hannu Laine, Ronald Brown, Olli Tyrkko, "mart-M3 Information Sharing Platform", IEEE, 2010 (Year: 2010).*

(Continued)

*Primary Examiner* — YuJang Tswei
(74) *Attorney, Agent, or Firm* — Matthew M. Hulihan; Heslin Rothenberg Farley & Mesiti PC

(57) ABSTRACT

A method provides a graphical interface for a computer system and includes receiving window information from each domain of multiple domains in which applications execute. Based on the received window information, the method builds the graphical interface on a graphics device of the computer system from graphics data provided from the multiple domains to the graphics device. The graphics device includes a GPU and graphics memory having multiple graphics memory portions, where each domain is dedicated a respective different graphics memory portion and is given write access thereto. The building issues commands to the graphics device that instruct the GPU to composition together graphics data from graphics memory portion(s) to thereby composition together graphics data from each of two of more domains of the multiple domains. The method also includes issuing commands to the graphics device to output the graphical interface to a set of one or more display devices.

19 Claims, 13 Drawing Sheets

(51) Int. Cl.
*G06T 1/60* (2006.01)
*G06T 11/60* (2006.01)
*G06F 9/451* (2018.01)
*G06F 9/455* (2018.01)
*G06T 11/00* (2006.01)

(52) U.S. Cl.
CPC .............. *G06T 1/60* (2013.01); *G06T 11/001* (2013.01); *G06T 11/60* (2013.01); *G06F 2009/45579* (2013.01)

(56) References Cited

U.S. PATENT DOCUMENTS

| | | | |
|---|---|---|---|
| 8,346,929 B1* | 1/2013 | Lai | G06Q 10/10 709/226 |
| 9,335,886 B2 | 5/2016 | Quinn et al. | |
| 2012/0166174 A1* | 6/2012 | Lipetskaia | G06F 9/454 704/3 |
| 2012/0284516 A1* | 11/2012 | Errico | G06F 21/32 713/168 |
| 2015/0089354 A1* | 3/2015 | Abrahami | G06F 16/958 715/235 |
| 2018/0113719 A1* | 4/2018 | Beaumont | G06F 21/84 |

OTHER PUBLICATIONS

"Xen Summit 2016, Consideration of Real Time GPU Scheduling of XenGT in Automotive Embedded System", [retrieved on Mar. 30, 2018]. Retrieved from the Internet URL: <https://xensummit2016.sched.com/event/7Lh3/consideration-of-real-time-gpu-scheduling-of-xengt-in-automotive-embedded-system-sangyun-lee-lg-electronics>, 2 pgs.

Sangyun, L., et al., "Consideration of real time GPU scheduling for XenGT in automotive embedded systems", Xen Project Developer Summit, Aug. 25, 2016, 17 pgs.

"Xen Summit 2016, Display Handler, a Client Display Framework for Xen" [retrieved on Mar. 30, 2018]. Retrieved from the Internet URL:<https://xensummit2016.sched.com/event/7LhK/display-handler-a-client-display-framework-for-xen-brendan-kerrigan-assured-information-security-inc>, 2 pgs.

Kerrigan, B., "Display Handler—A framework and implementation for client virtualization interaction", Xen Project Developer Summit, Aug. 25, 2016, 29 pgs.

* cited by examiner

ON-GPU COMPOSITIONING OF GRAPHICAL DATA FROM MULTIPLE DOMAINS

STATEMENT REGARDING FEDERALLY SPONSORED RESEARCH

This invention was made with government support under contract FA8750-12-D-0002 awarded by the Department of the Air Force. The government has certain rights in the invention.

BACKGROUND

For security, privacy, or other reasons, it may be desired to prevent the exchange of data between two information domains being presented by a computer system. An example is the separation desired between a corporate information domain and a personal information domain, for instance when information associated with a corporate email client, such as the content of the email messages and the email account password stored by the program, is to remain within the corporate domain and the contents of a personal email message are to remain within a personal domain and kept from entering the corporate domain. Corporate and personal domains are just two examples of domains that might be defined for the containment of information. Other examples include, but are not limited to: a healthcare domain—containing patient information and/or applications that use patient information; finance—containing sensitive financial data; and government containing encrypted confidential information that is decryptable by a verified application but that is not to be copied or duplicated.

Existing approaches for allowing a user to interact with separate domains as part of a single interface while preventing cross-domain transfer of information may be improved-upon to increase security, boost efficiency, and provide other benefits.

SUMMARY

Aspects described herein provides capabilities for multi-domain application-level composition with a variety of devices, leveraging efficient GPU memory operations. Users can interact with multiple operating systems on a single desktop (a desktop being a set of displays fed from a single graphics device—sometimes referred to as a "GPU"—of a single computer system). Also provided are aspects for automatically loading user-configured display layouts based on various monitor 'fingerprints'. The verbs and related forms of "composite" and "composition" are used interchangeably herein.

Shortcomings of the prior art are overcome and additional advantages are provided through the provision of a computer-implemented method of providing a graphical interface for a computer system. The method includes receiving window information from each domain of multiple domains in which applications execute, the multiple domains executing as separate execution environments for executing their respective applications, the window information from each domain informing of window position and size for a respective one or more applications executing in the domain. The method further includes, based at least on the received window information, building the graphical interface on a graphics device of the computer system from graphics data provided from the multiple domains to the graphics device, the graphics device including a graphics processing unit and graphics memory having multiple graphics memory portions, wherein each domain of the multiple domains is dedicated a respective different graphics memory portion of the multiple graphics memory portions and is given write access thereto, wherein the building includes issuing commands to the graphics device that instruct the graphics processing unit to composition together at least some graphics data from each of two or more graphics memory portions of the multiple graphics memory portions to thereby composition together graphics data from each of two of more domains of the multiple domains. The method also includes issuing commands to the graphics device to output the graphical interface to a set of one or more display devices Computer systems and computer program product relating to one or more aspects are also described and claimed herein.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
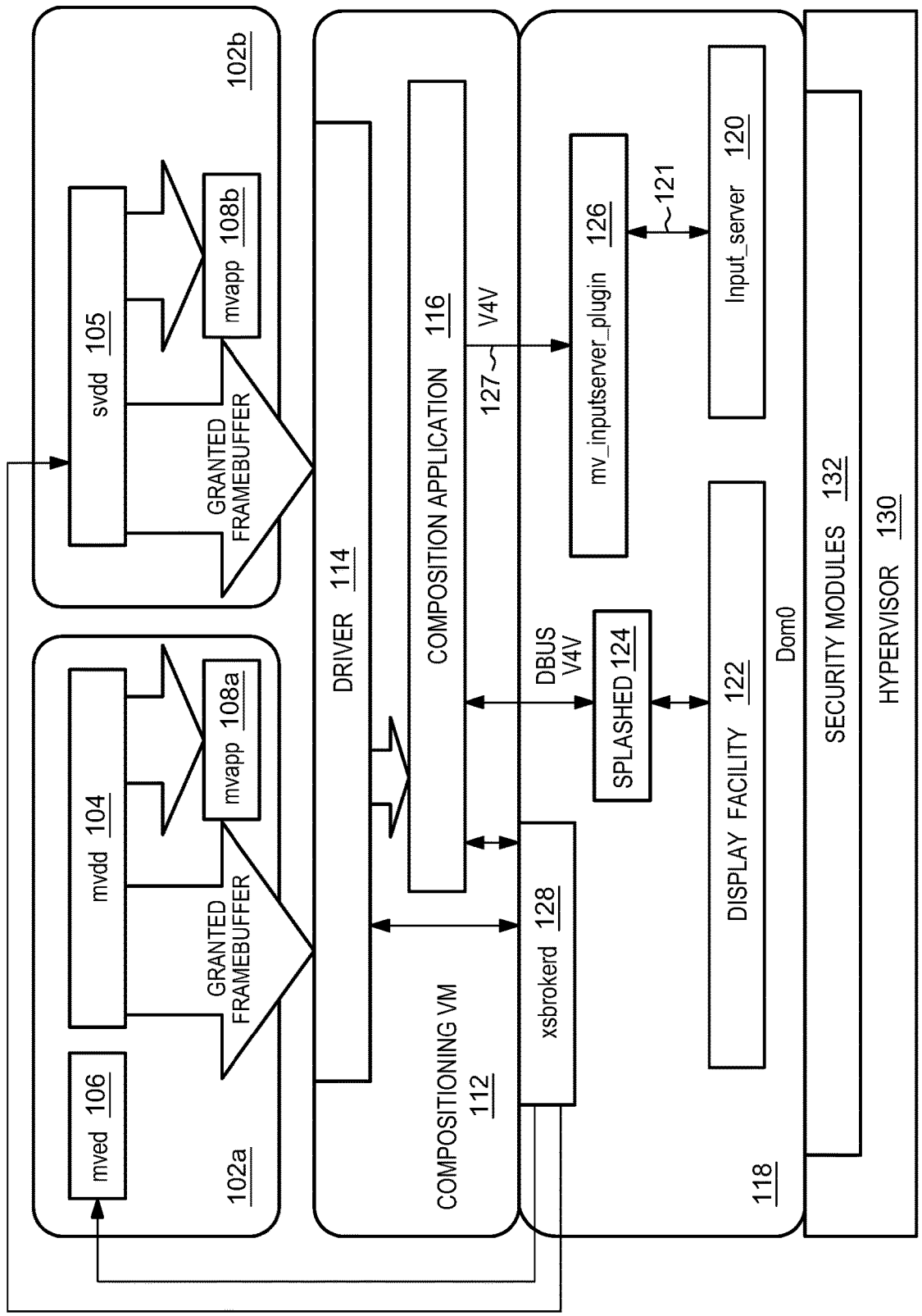
FIG. 1 depicts an example desktop compositor architecture.

Hypervisors can provide seamless windowing capability, though challenges exist in speed, security, and performance, together with finding improved user experience by reducing the strain on users' locus of attention when working in multiple domains. FIG. 1 depicts an example desktop compositor architecture. The example desktop compositor functions to display the applications from active guest virtual machines (VMs) in one place. Using desktop compositing, an interface appears as a single, global desktop with application windows from different domains. The framebuffer contents of each guest VM are presented to software as read-only using granted memory (e.g. via a shared memory mechanism of the well-known Xen hypervisor). This allows for the composition and display of video information as a merged desktop.

FIG. 1 shows a simplified overall system diagram of the architecture. Guest virtual machines 102a and 102b are separate execution environments to execute respective applications, and in this example they correspond to different information domains. Guests 102a, 102b together with compositioning VM 112 run above hypervisor 130 having security modules 132. A control domain 118, known as Dom0, is an initial domain started by the hypervisor. Each other guest (102a, 102b, 112) is sometimes referred to as an unprivileged domain (DomU).

Within guest 102a, MVDD 104 is a Windows® XPDM driver that provides the ability to grant out the guest's framebuffer to compositioning VM 112 (Windows® is a line of operating systems offered by Microsoft Corporation, Redmond, Wash., U.S.A., and is a trademark of Microsoft Corporation). MVED 106 is Windows® driver that provides event handling to component xsbrokerd 128 (described below) of control domain 118.

Within guest 102b, SVDD 105 is display driver for the Linux operating system that provides the ability to grant out the guest's framebuffer to the compositioning VM 112. MVAPP 108a, 108b is a userspace application that runs in both Windows® and Linux® guests 102a and 102b, respectively, that queries the guest's window manager for information on each of the currently-available windows being displayed on the system. MVAPP 108a, 108b provides that information to assist the composition application 116 of the compositioning VM 112 in determining proper window composition.

The control domain 118 runs xsbrokerd 128, a daemon that mediates access to a channel of bidirectional communication in the architecture. Via xsbrokered 128, guests and the control domain, Dom0, can communicate state, handshake, and resolution information. Xsbrokered 128 ensures that communications fit the profile required, thus precluding its use as an effective covert communication channel and guaranteeing that communication only occurs between the appropriately privileged guests. Control domain 118 also includes splashd 124, my inputserver_plugin 126, display facility 122, and input server 120. splashd 124 provides logging of information from the compositioning VM 112 and also provides informational splash screens about the desktop compositor's status to the user via a DBus interface that is exposed by display facility 122. The my inputserver_plugin 126 connects to the input server 120 via a socket interface 121 and directs the input server 120 to change the input focus of the system based on composition information that the composition application 116 provides to the plugin 126 over interface 127. input server 120 is part of XenclientXT/OpenXT, provides input to guests and intercepts some key bindings for users to be able to switch VMs. It also provides an interface to allow for plugins to react to input events. Display facility 122 provides a zero-copy method for displaying framebuffers.

Driver 114 runs within the compositioning VM 112 and provides the ability to map-in other guests' framebuffers, allowing the composition application 116 to access those buffers for composition. The composition application 116 is a userspace application that composes the guest framebuffers and makes decisions on relevant user focus.

The example of FIG. 1 includes a relatively large number of different components resulting from its complex architecture and distribution of functionality across many components. In some cases, user experience may be impacted due to lack of access to a user interface VM (for switching between domain VMs and other tasks) from within the compositioning software, input latency, and potential delays while switching in and out.

Figure 2:
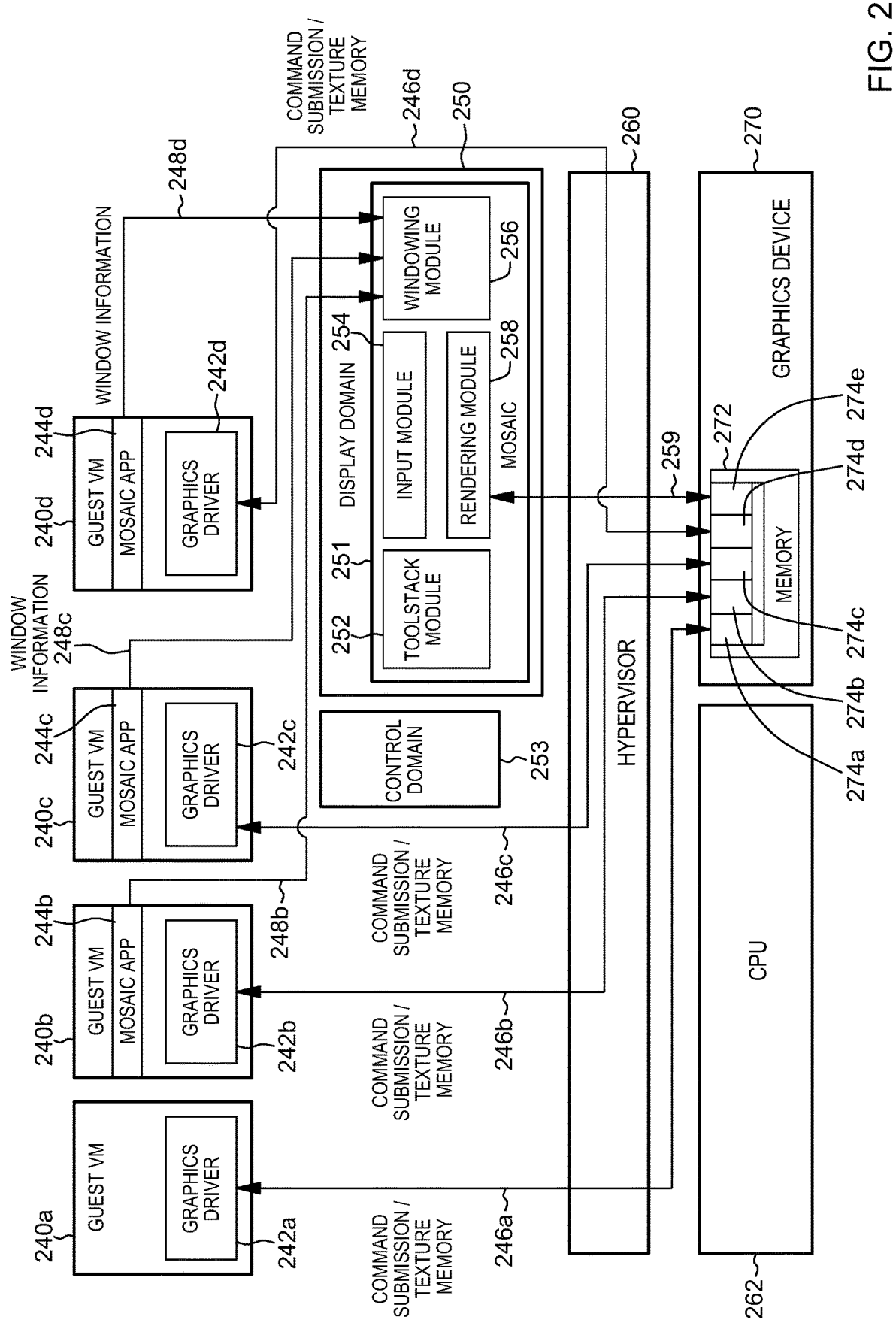
FIG. 2 depicts an example architecture that leverages graphics memory operations for providing a graphical interface for a computer system, in accordance with aspects described herein.
Figure 3:
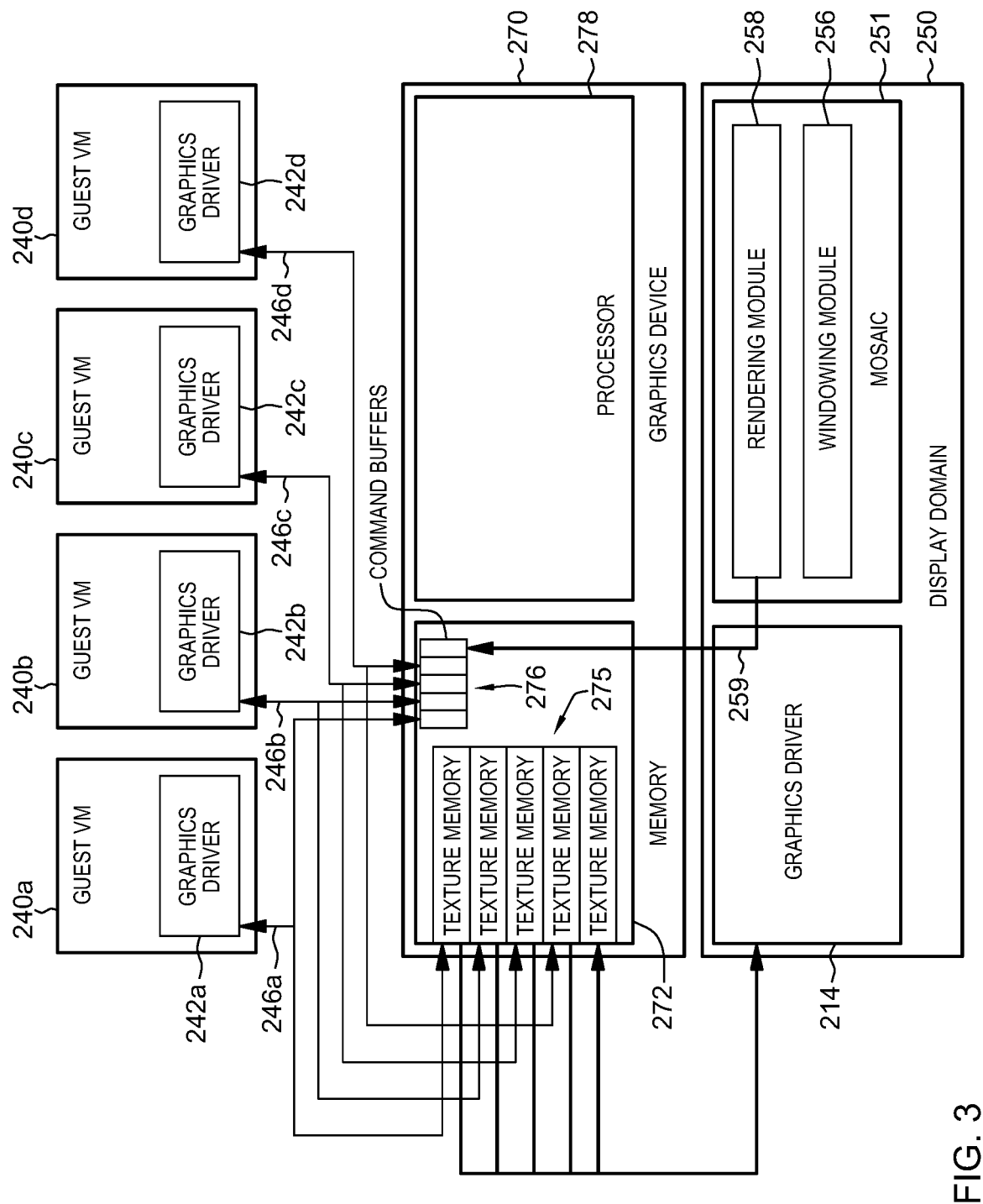
FIG. 3 depicts further details of the architecture of FIG. 2.

A facility described herein with reference to FIGS. 2 and 3 is referred to as Multiple Operating System Application Interface Compositing (Mosaic). Mosaic enables interaction with multiple domains with minimal strain on users' locus of attention. FIG. 2 depicts an example architecture for Mosaic as it leverages graphics memory operations for providing a graphical interface for a computer system (such as the computer system on which Mosaic executes) in accordance with aspects described herein. Mosaic provides a more direct approach to compositing windows from separate domains. The Mosaic specific code resides in a display domain (also referred to as a compositioning domain and which may or may not be the same as the control domain, Dom0), and results in fewer code bases compared to the nine (including four drivers) of the architecture of FIG. 1. In some examples, Mosaic runs as a user space application that includes four modules: a toolstack module, an input module, a rendering module, and a windowing module, described in detail below.

The architecture of FIG. 2 includes multiple domains running as guest VMs 240a, 240b, 240c, and 240d over a hypervisor 260. "Guest", "domain" and "VM" are sometimes used interchangeably herein to refer to one of the individual domains from which graphics data is being composited. Display domain 250 also runs over hypervisor 260 as a guest VM. Control domain 253 is shown in this example and may perform similar aspects as those of FIG. 1. Hypervisor 260 runs on/over hardware, which includes the depicted hardware CPU 262 and graphics device/GPU 270, and other hardware not depicted.

Each VM 240a-240d includes a respective graphics driver 242a, 242b, 242c, 242d to access graphics device 270 and 'talk' to a respective memory portion (274a-274d) of the graphics device memory 272, placing graphics data therein. This communication is depicted as command submission/texture memory channels 246a, 246b, 246c and 246d, corresponding to VMs 240a, 240b, 240c an 240d, respectively. Each domain is dedicated a respective different graphics memory portion of multiple graphics memory portions of the graphics memory 272 and is given write access thereto so that it can write graphics data to the memory. Additionally, display domain 250 is also dedicated a graphics memory portion 274e. As is explained herein, Mosaic instructs the graphics device 270 what to do with graphics data placed into the different memory portions in order to composition-together graphics data from multiple domains to build a graphical interface for output from the graphics device 270 to display device(s). The desired graphics data selected from the memory portions corresponding to the different domains is composited in memory portion 274e that is dedicated to the display domain. This compositing includes instructing the graphics device 270 to copy/move data from memory portion(s) (274a-274d) to the memory portion 274e for output.

The compositioning domain may also function as the control domain, as in FIG. 1, or may be a different domain, such as the display domain in the example of FIG. 2. In this example, user input goes through the compositioning/display domain.

In the display domain 250, the Mosaic facility 251 includes toolstack module 252, input module 254, windowing module 256, and the rendering module 258. Toolstack module 252 communicates with a toolstack of hypervisor 260 to obtain information about guest VMs, such as their run state, unique identifier, and any other information of interest (user friendly name, icon, associated color, etc.). This provides a consistent interface from which other modules may obtain this information without tying the intimate details of how the toolstack works with the rest of Mosaic. The input module 254, windowing module 256, and rendering module 258 utilize this information to generate per-VM resources required for their operation.

The input module 254 directs input events from input hardware (mouse, keyboard, touch screen, tablet pen, accelerometer, GPS sensors, etc.) to the guest VM that is currently in focus for the user by querying the correct focus VM from the windowing module 256. Input events are redirected to the VM in focus, with the exception of extra-VM input that is processed for other purposes (e.g. hotkeys to switch guest VMs, full screen guest windowed mode handling, etc.).

The windowing module 256 maintains the focus state of the system and generates the visibility information for each guest VM. In Mosaic, this visibility information may be generated based on application window position and size information provided to the windowing module 256 by the guest via an in-guest agent, e.g. the Mosaic app 244b, 244c, 244d that communicates this as window information 248b, 248c, 248d to the windowing module 256. The agents collect window information (locations, size, stack order, etc.) and metadata about these windows and forwards this information over the respective inter-VM communications channels 248b, 248c, 248d to the Mosaic module 251 running in the display domain.

If the guest VM is not running the in-guest agent, as is the case of guest VM 240a in FIG. 2, the windowing module 256 can generate visibility information to the rendering module 258 that presents the domain to the user as the whole guest OS (i.e. the entire desktop interface of the guest) within a window. In other words, since window information is not provided, the graphics data from the VM may be treated as a single window of information for presentation in the composited graphical interface.

Based at least on the received window information, Mosaic builds a graphical interface on the graphics device 270 (e.g. in 274e) from some or all graphics data provided from the multiple domains. The graphical interface includes graphics data from the one or more of the domains (240a-240d) and, optionally, graphics data not obtained from the domains, such as added markings that Mosaic may place into the graphical interface for convenience or other reasons. Borders, shading, animations, or the like may be placed by Mosaic over/in place of graphics data from the domains. For instance, a colored border may be placed by Mosaic around graphics data showing an application window from one of the guest VMs, in which case the border graphics are graphics data that was not obtained from an underlying guest but instead injected by Mosaic.

The windowing module 256 collates the windowing information to produce the visibility information, which is provided to the rendering module 258 for displaying the composed view. The rendering module 258 translates the visibility information provided by the windowing module 256 into appropriate commands for the device that will render the composed output of the system (i.e. the graphics device 270). Commands can be, for instance, graphics device instructions as command submissions 259 to perform texture copies wholly within graphics device memory for enhanced performance, more efficient power usage, and 3D capabilities, or even instructions for a network protocol for remote display of composited guest VMs, as examples.

Further details of the architecture of FIG. 2 are now provided with reference to FIG. 3, in which reference numerals of FIG. 2 are used in FIG. 3 to denote like components. Graphics memory 272 is partitioned into separate spaces for each guest to address and write to via an in-guest driver. This partitioning may be done such that non-privileged guest VMs (e.g. 240a-240d) are restricted to reading from and writing to only the graphics device memory portion(s) allocated to it by the hypervisor and toolstack; they may be restricted, using an input-output memory management unit (IOMMU) as an example, from accessing other VM's graphics device memory portions. Thus, each domain of the multiple domains from which graphics data is being composited is restricted from writing data to every graphics memory portion that is other than the portion dedicated to that domain.

The graphics device memory is further partitioned in this example into texture memory portions 275 (representing the data path) and command buffers 276 (representing the control path), though other memory portions might be present and guests might have additional portions of graphics memory dedicated to them individually. In this regard, guest might place commands into their dedicated command buffers to operate on their own graphics data, for instance: 'rotate texture X 90 degrees on the Z axis' as one example. Thus, each guest VM 240a, 240b, 240c, 240d and display domain 250 is dedicated a respective portion of texture memory and respective command buffer, which together constitute a 'graphics memory portion' dedicated to the respective domain. Each guest 240a-240d has its own channel 246a-246d, respectively, for writing via the graphics driver 242a, 242b, 242c, 242d directly to the guest's dedicated texture memory portion and command buffer portion of the graphics device memory, and therefore the graphics data provided by the multiple domains to the graphics device is provided absent/without providing that graphics data to the display domain.

Command buffers 276 receive commands that may be interpreted/executed by the graphics device processor 278 to perform actions on the graphics device 270. As part of building the graphical interface, the display domain 250 interacts via graphics driver 214 with the graphics device 270 to read graphics data from guest texture memories and write/copy at least some to the texture memory dedicated to the display domain. Commands are issued to the graphics device by the display domain and instruct the graphics processing unit to composition-together at least some graphics data from two or more graphics memory portions 274A-274d. The compositioning can copy the desired graphics data of the desired domains to the graphics memory portion dedicated to the display domain and arrange that based on the received window information, e.g. to identify the correct graphics data and positioning thereof to copy for the composited interface being built. This thereby composition-together graphics data from each of the two of more domains associated with those two of more graphics memory portions.

The display domain 250 is given read-only privileges on the texture memory portions dedicated to the individual guest VMs 240a-240d. Mosaic 251 generates commands that it submits to its command buffer portion of the command buffer. The commands execute on the graphics device to perform the necessary on-graphics device texture copying from guest VM dedicated texture memory portions of texture memory 275 into the display domain's dedicated portion of texture memory.

Thus, the Mosaic software of the compositioning domain 250 calculates the compositioning that is to occur. The guests push their graphics data to the graphics device and the compositioning domain, for instance the rendering module 258 thereof, issues instructions to a dedicated command buffer via channel 259. The graphics device executes those instructions to compose, in the texture memory of the compositioning domain, the graphical interface that the graphics device is to send out to the display(s). Once this copying is complete, the compositioning domain's texture memory may be rendered, e.g. to a frontbuffer, resulting in the composited view/built graphical interface being displayed on the monitor or set of monitors. The rendering to the display(s) may be achieved by the display domain issuing commands to the graphics device to output the built graphical interface to a set of one or more display devices.

In contrast to the architecture of FIG. 1, the graphics data from the individual domains is not being collected by the compositioning domain, nor is it being composited together within the compositioning domain or then pushed out to the graphics card for display. Instead in the Mosaic example, the graphics data is woven together on the graphics device for output therefrom to the display device(s).

Mosaic can composition pixel and texture graphics data, and, in terms of the texture data, the compositioning is achieved faster than if data were transferred from one of the domains (e.g. a guest or display domain 250) to the graphics memory, since the graphics device can copy texture data between texture memory portions faster than data can be passed from a guest down to the graphics device memory. Bulk copying of pixel data in its raw form is avoided in favor of command submission to the graphics device to composition that information. The compositioning occurs when portions of graphics data from multiple domains is placed into multiple texture memory portions and is selectively copied by the display domain into the display domain texture memory buffer for piping to the display(s). The graphics data piped to the display(s) therefore includes a mix of graphics data from multiple domains, rather than graphics data from only a single domain at any given time.

Various display modes are available for presenting the graphical interface across monitor(s). The graphical interface can include graphics data from all or a portion of one or more domains. A seamless mode described below presents individual application windows for multiple guests in a single coherent desktop and allows for interaction with applications within multiple guests as if they were in a single guest. A windowed mode allows for a guest VM's entire desktop to be encapsulated in a single window, providing an experience similar to a remote desktop session. Other modes described herein include extended, cloned, and pinned.

In extended mode, a VM has control of all of the physical displays except those that may already be in 'pinned' mode (which pins the graphics from one VM to one or more displays). The extended mode provides a multi-monitor experience similar to what one would expect using multiple monitors with a single desktop, but with the advantages of having a keyboard-video-mouse (KVM)-style switch that could map all monitors at once to a different machine with a simple hotkey. When the focused VM is in full screen mode, it may be the only VM visible on the desktop. To get to other VMs, the user can input CTRL+TAB (as an example) to rotate through VMs, input CTRL+<VM #> (as an example), or hit CTRL+0 (as an example) to get to the user interface VM (UIVM)) and then select the desired VM. The graphics data from the VM is not guaranteed to be sized the same as the display, however, for instance when Mosaic reduces the size of the VM graphics to make room for a banner.

Figure 4:
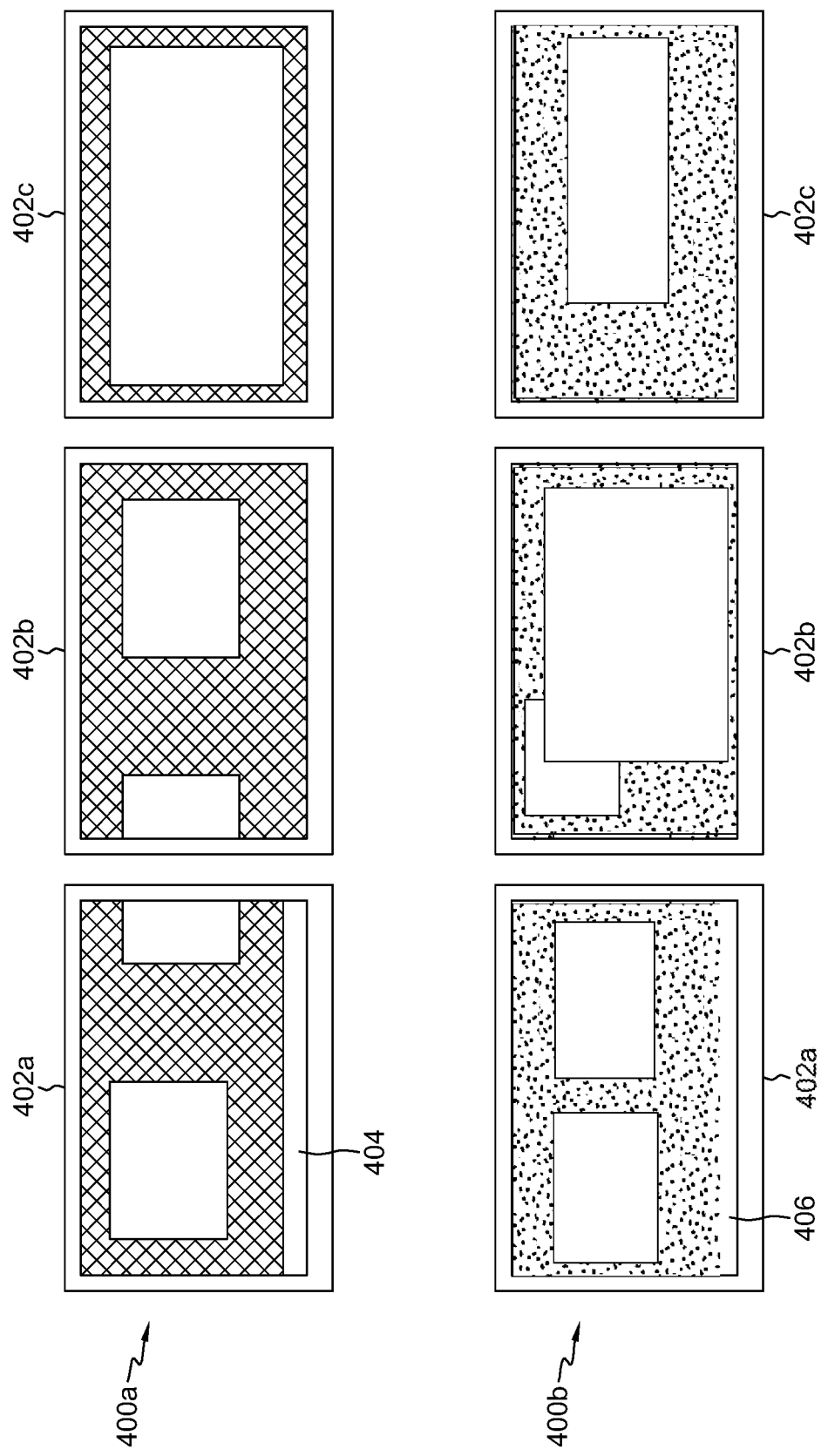
FIG. 4-8 depict example display modes for the architecture of FIG. 2, in accordance with aspects described herein.

FIG. 4 depicts an example of the extended display mode on three displays before and after a VM switch, in accordance with aspects described herein. An extended desktop before the VM switch (400*a*) spans all three monitors 402*a*, 402*b*, 402*c* and depicts four application windows of a first VM as well as a banner 404 imposed by Mosaic for presenting information such as an identification of the in-focus and depicted domain. Upon a VM switch to another VM, for instance by toggling a hotkey, a different extended desktop is shown (400*b*) spanning all three displays 402*a*-402*c*, depicting four application windows of a second VM, and with a different banner 406 that indicates the newly in-focus and depicted domain. The extended mode maximizes screen real estate and shows display overlay(s) including a banner.

Figure 5:
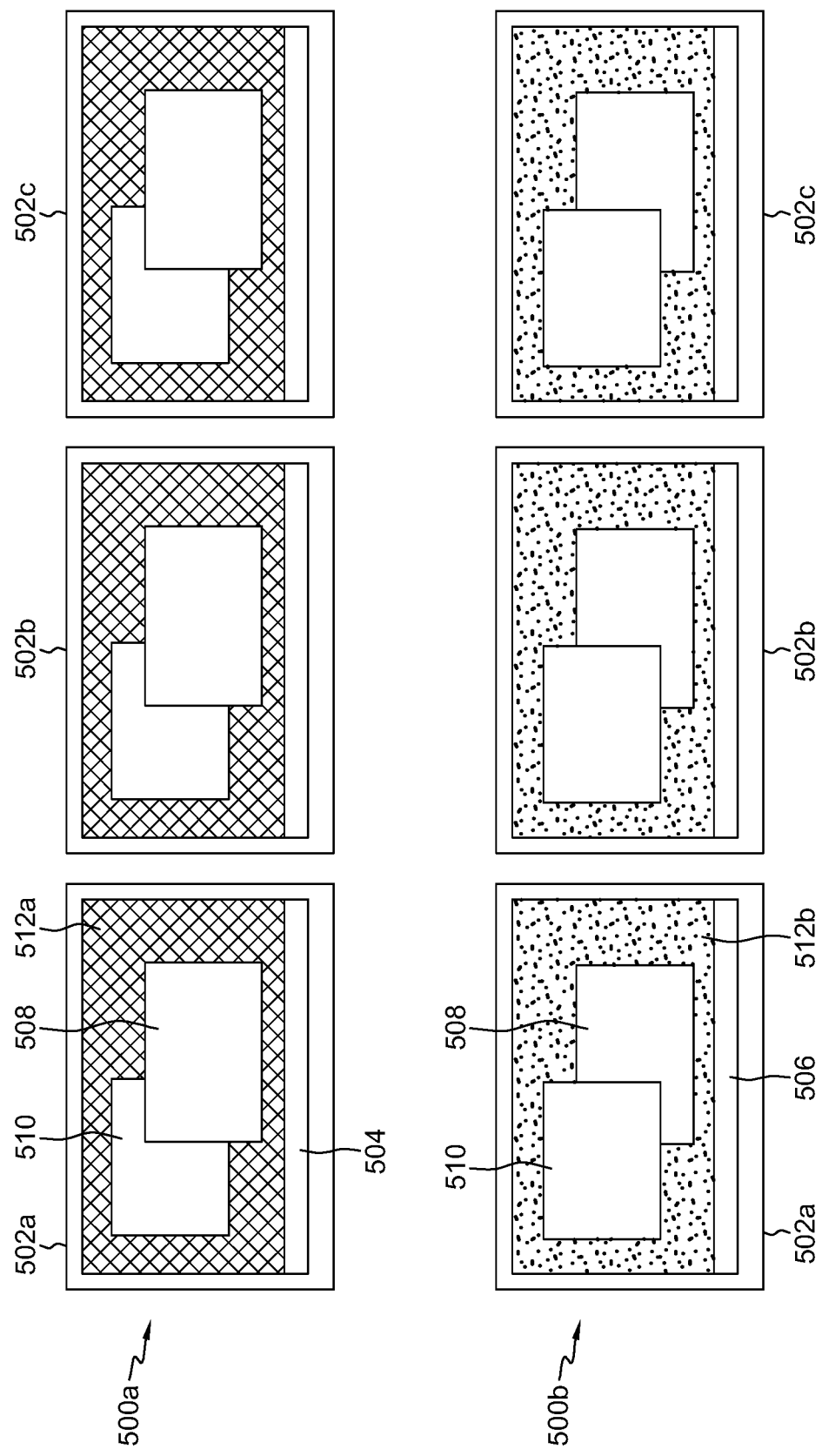

A cloned display mode duplicates the output of one VM across all displays that are not 'pinned' as described herein. FIG. 5 depicts an example of the cloned display mode on three displays before and after a VM switch, in accordance with aspects described herein. Initially shown is cloned desktop before the VM switch (500*a*), in which an interface is cloned across all three displays 502*a*, 502*b*, 502*c*. The interface is compositioned from two domains in this example, in which the first window 508 is from a first, in-focus VM, and the second window 510 is from a second VM. The background 512*a* of the interface can also provide a visual indication to the user of which domain is in-focus, for instance the background could be the background/wallpaper of the desktop of the in-focus VM. Additionally or alternatively, the visual indication may be provided through color, patterns, or any other graphical indication, such as banner 504. Upon a VM switch (500*b*) to another VM, i.e. to the VM from which the second window 510 is taken, a different extended desktop is shown in which the another VM is in-focus, therefore the second window 510 is brought in-focus and the desktop wallpaper 512*b* changes to identify the other VM, for instance by displaying its desktop background/wallpaper. Appropriate banners 504, 506 are displayed if desired to help identify the VM in-focus at the time. Cloned mode is useful in various situations, for instance when laptops running several domains connect to projectors or video walls.

Figure 6:
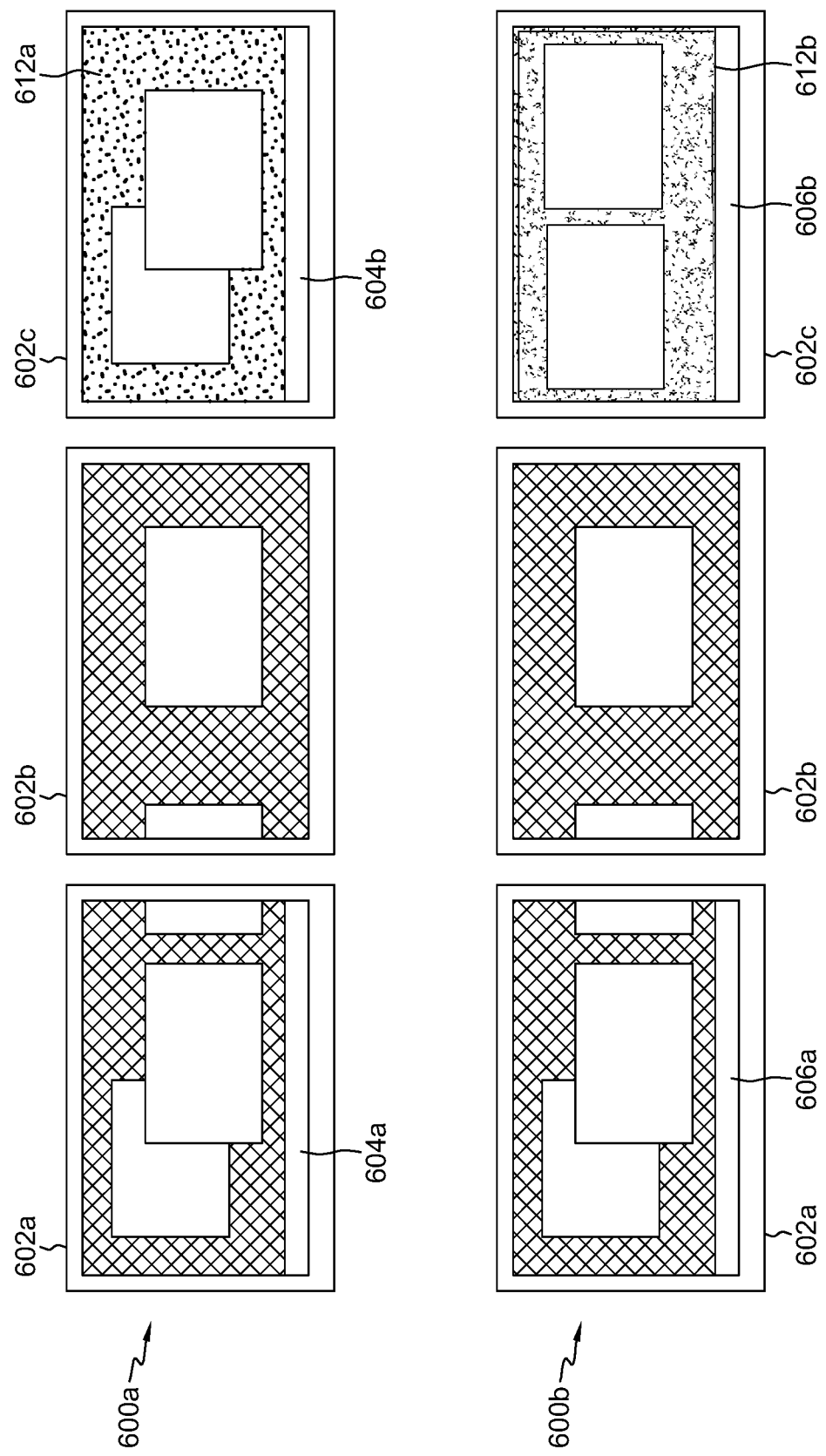

FIG. 6 depicts a pinned display mode on three displays before and after a VM switch, in accordance with aspects described herein. Pinned mode allows allocation of a specific display or set of displays to one guest. In FIG. 6, VM 1 has two displays (602*a*, 602*b*) pinned to it, leaving one shared display 602*c* that the other guests can switch onto based on the current focus. Before the switch (600*a*), the graphical interface being displayed across the three displays includes graphics data from VM 1 extended across displays 602*a* and 602*b* with banner 604*a* indicating VM 1, and graphics data from VM 2, including two windows and background 612*a*, is shown on display 602*c* with banner 604*b* indicating VM 2. To build this interface, Mosaic appropriately compositions graphics data from VMs 1 and 2 on the graphics device for output to the three displays in the construction shown. As between VM 1 and VM 2, this is what is displayed regardless of which is the in-focus domain.

Since displays 602*a*, 602*b* are pinned to VM 1, a switch to another VM causes a change to what is presented in display 602*c* only. Thus, after the switch (600*b*), graphics data from VM 1 remains extended across displays 602*a* and 602*b* with banner 606*a* continuing to indicate VM 1, while graphics data from the switched-to VM (VM 3) shows on display 602c with banner 606b indicating VM 2. The graphics data of VM 2 also includes two windows of VM 2 and a different background 612b.

Figure 7:
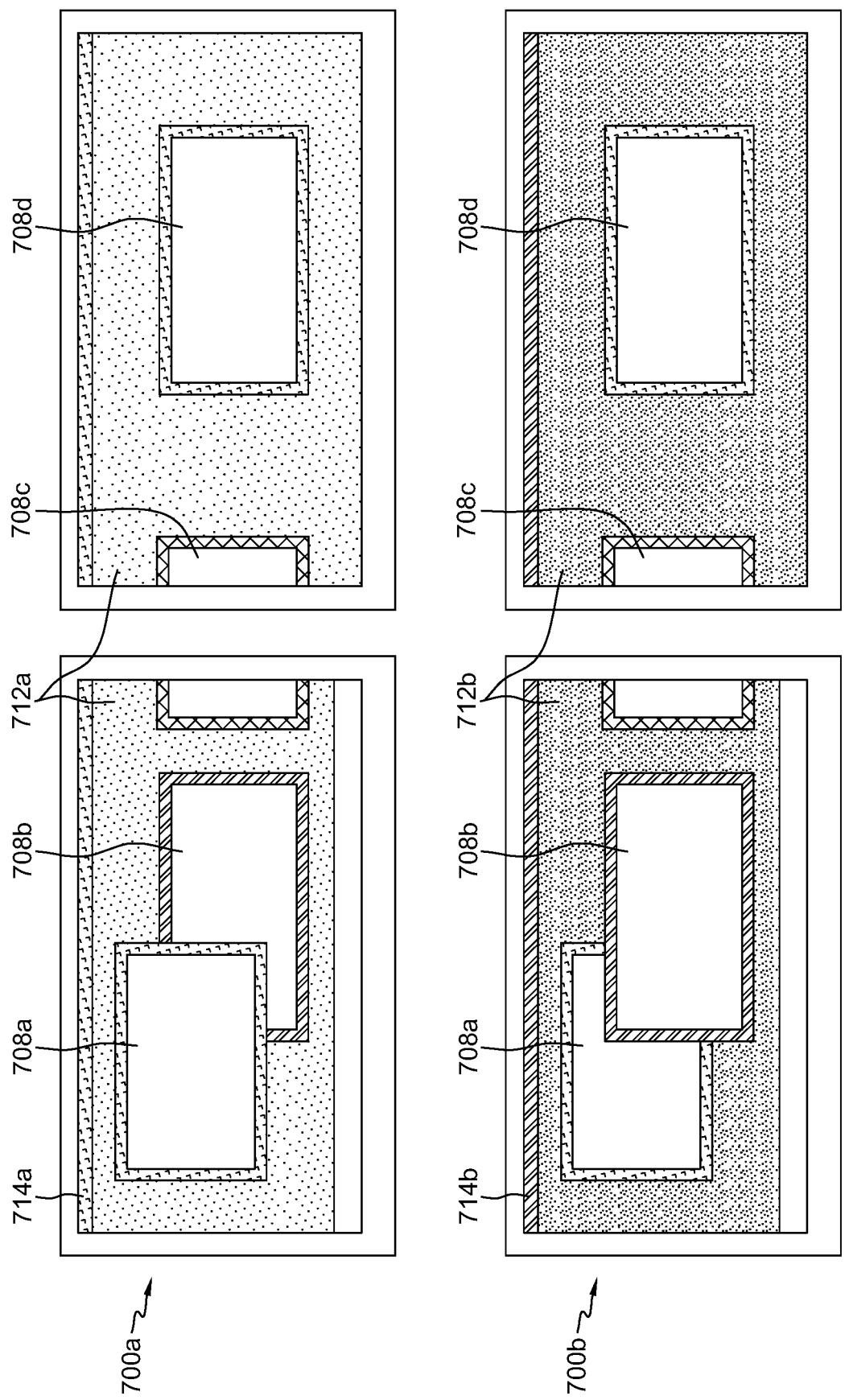

FIG. 7 depicts an example of the seamless display mode on two displays before and after a VM switch, in accordance with aspects described herein. When configured for seamless mode, a VM behaves nearly identical to a VM in full screen mode. A difference is that the VM's application windows are given colored borders (or other identifying markings), and the user is able to simultaneously see applications from other VMs that are also in seamless mode together with the full desktop of VMs that are in windowed mode simultaneously. Users can move applications (i.e. their windows) from guests in seamless mode anywhere on the Mosaic desktop, which is configured from the UIVM (see below). The background and taskbar that is visible may belong to the currently focused VM. Before the switch (700a), VM 1 is in focus and the desktop shows windows 708a and 708d from VM 1, window 708b from VM 2, and window 708c from VM 3. Each window is bordered by a desired graphical indication (color, pattern, etc.) corresponding to the VM from which the window is taken. Thus, windows 708a and 708d have the same border, and windows 708b and 708c each have their own border unique from each other and from the border of windows 708a and 708d. Because VM 1 is in focus, the background 712a on the displays is, in this example, VM 1's background, though the background could be anything desired. Additionally, a banner bar 714a is shown across the top of the interface on each display to convey that VM 1 is in focus. On a switch (700b) in focus to VM 2, window 708b is brought in focus to overlap window 708a of VM 1, and the desktop background 712b changes to the wallpaper of VM 2 in this example. Banner bar 714b is shown across the top of the interface on each display to convey that VM 2 is in focus. The windows stacks of the windows 708a-708d are managed as though the windows were being presented from a single desktop environment, even though they are actually composited from multiple guests in this example.

Figure 8:
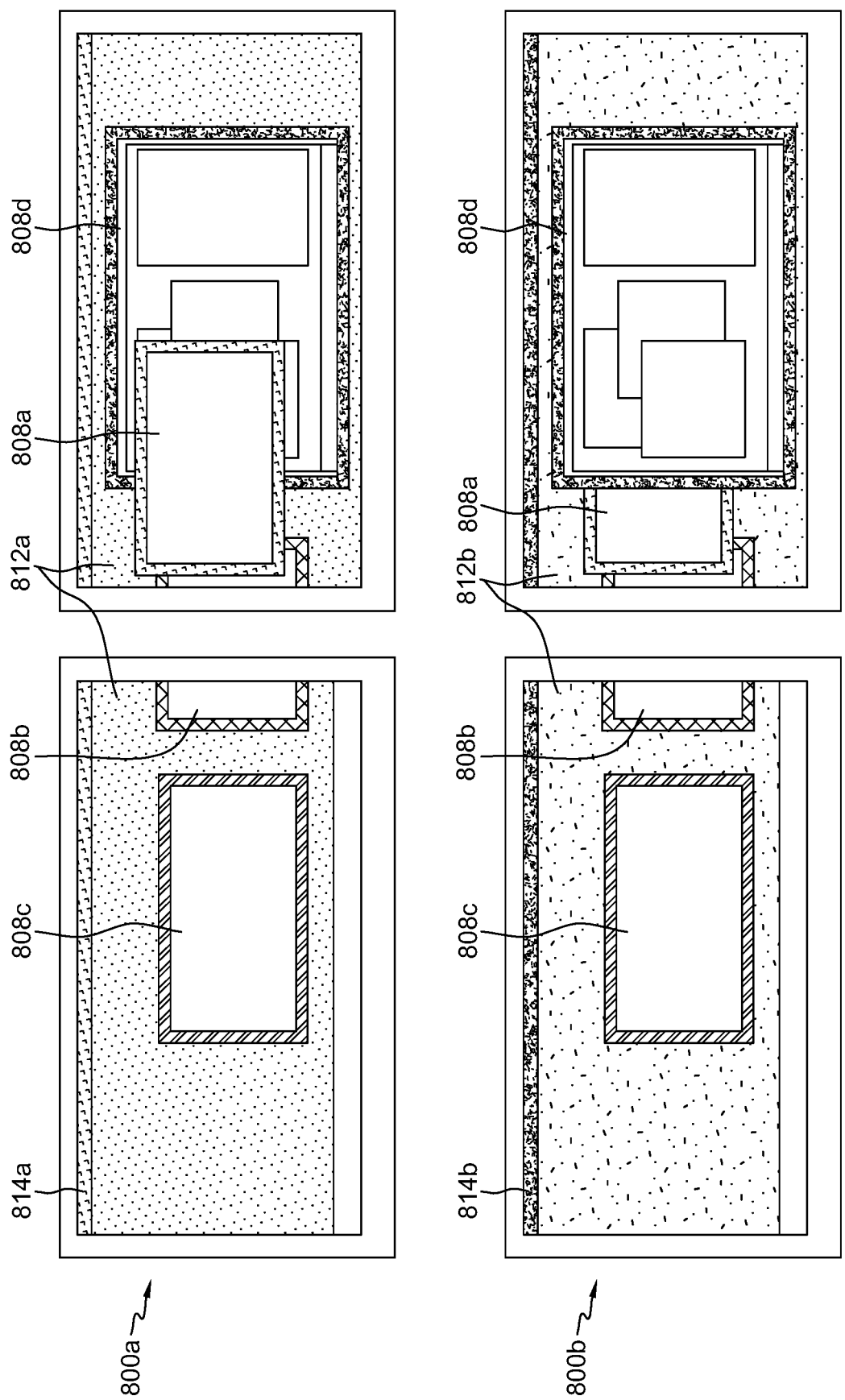

FIG. 8 depicts an example of the windowed display mode on two displays before and after a VM switch, in accordance with aspects described herein. When configured for windowed mode, the interface of a VM is contained within a window on the desktop. Before the switch (800a), the desktop presents window 808a from in-focus VM 1, window 808b from VM 2, window 808c from VM3, and window 808d showing the individual desktop of VM 4 (with three windows in this example). Appropriate borders to windows 808a-808d are shown to convey the VM from which the graphics data is pulled. Because VM 1 is in focus, the background 812a on the displays is, in this example, VM 1's background, though the background could be anything desired. Additionally, banner bar 814a is shown across the top of the interface on each display to convey that VM 1 is in focus. On a switch (800b) in focus to VM 4, the interface 808d of VM 4 in the windowed mode is brought in focus above window 808a. In this example, the desktop background 812b changes to the wallpaper of VM 4 and banner bar 814b shown across the top of the interface on each display conveys that VM 4 is in focus. In other examples, when a switch is made to focus on a VM in windowed mode, the previously in focus, non-windowed mode VM's background (e.g. 812a in the example of FIG. 8) could remain displayed even after the switch. Alternatively, the background presented on each display could be any other desired background, for instance a solid color such as gray to help void user confusion. As before, the windows stacks of the windows 708a-708d are managed as though the windows were being presented from a single desktop environment, even though they are actually composited from multiple guests in this example. One benefit to enabling windowed mode for VMs is that the user may be able to see more than one VM at the same time. Examples include VMs overlapping on a single monitor, 1 VM per monitor (in a multi-monitor configuration), and VMs spanning more than one monitor. The window that the VM is contained in can be moved, resized, and maximized.

Mosaic also provides the ability to automatically recognize a previous display mode configuration via fingerprinting. A fingerprint may be identified based on one or a combination of a monitor-provided Extended Display Identification Data (EDID) information and information of the connector used to attach that monitor. For example, a user may configure Mosaic to have an extended display mode desktop when the laptop is plugged into an external monitor, and a cloned display mode desktop when the laptop is plugged into a projector. Each of the preceding situations can be identified by a fingerprint that is determined and saved upon committing the configuration. Mosaic can automatically switch between these modes based on whether a fingerprint that is obtained based on a current environment (set of displays) matches to one of the saved fingerprints, i.e. indicating the user has previously used and configured the mode to use with this given set of display(s). This can also work with monitor arrangement geometry; different sets of monitors (perhaps some configured vertically stacked, some horizontally) can have their proper configuration recognized after a one-time setup on that particular set. Thus, as part of building the graphical interface for output to a set of displays, the building may be in accordance with a fingerprint for the set of displays, the fingerprint identifying a configuration of the portions of the graphical interface to display on each of the display devices. The output of the graphical interface to the set of displays will output, to each display, a respective graphics output that corresponds to the portion of the graphical interface to display on that display as indicated by the configuration indicated by the fingerprint.

As described above, borders or more generally classification markings can be any desired visual indicators to distinguish between graphical elements from the different domains. Colors, patterns, text, shapes, animations, designs, etc. may all be employed to distinguish VMs and VM groups. Administrators or users could add 'hash marks' or other indicators to banners and decorations to indicate specialization among VMs of the common classification. Thus, for instance, two VMs may be distinguished from each other by different markings, while colors, other markings, etc. may also be used to indicate a common classification among the VMs and distinguish them from other VMs. As one example in which graphics data from two personal domains and two corporate domains are composited on a single graphics device and displayed across monitors, four different color borders may be used to identify windows from the four different domains, while distinct markings (say forward slashes) are used in the borders of the windows of the two personal domains and other markings (asterisks) are used in the borders of the windows of the two corporate domains.

A management/administrative system referred to as SVMS may enable a user to remotely specify per-VM classification information, including a short-form label, long-form label, classification color, secondary classification color (such as hash marks), banner height, per-application window banner style, and any other desired information about each VM. In some examples, these features are configurable remotely, offering control to a workstation on which Mosaic runs and that is connected to the set of displays.

The user interface VM (UIVM) is a separate VM providing user-interface features, including the marking features described above with respect to the SVMS, to facilitate user interaction with the multiple domains from which graphics data is being composited. In some embodiments the UIVM is a standalone VM separate from the display domain and/or control domain, while in other embodiments, the display domain and/or control domain also function as the UIVM.

Figure 9:
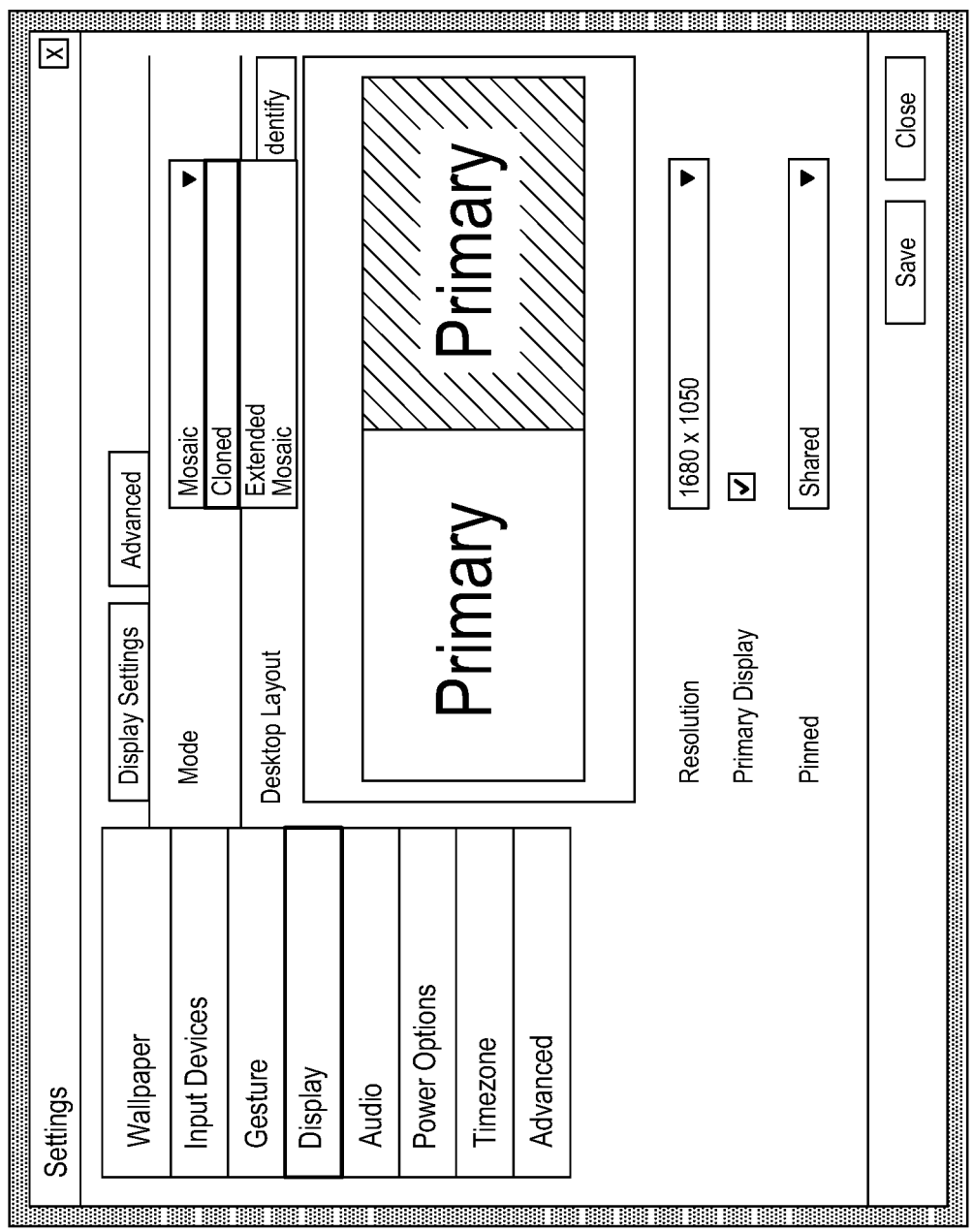
FIG. 9 depict an example display configuration menu for configuring multi-display systems in accordance with aspects described herein.

Part of the functionality of the UIVM is to provide configuration of the Mosaic software. FIG. 9 depicts an example display configuration menu within the UIVM to allow users to configure multi-display systems for Mosaic in an easy and intuitive manner. The user sets the mode to 'Mosaic' for each of one or displays in order to make each such display part of the Mosaic composite desktop. Not all displays need to be part of the Mosaic composite desktop. FIG. 9 also shows how a user can position the participating monitors (shown as two monitors arrayed horizontally). As is seen, the user can configure display resolution, position, and mode from within the Display tab in the Settings dialog within the UIVM. The user can also set the pinned (to a VM) setting, which in this case is set to Shared.

Figure 10:
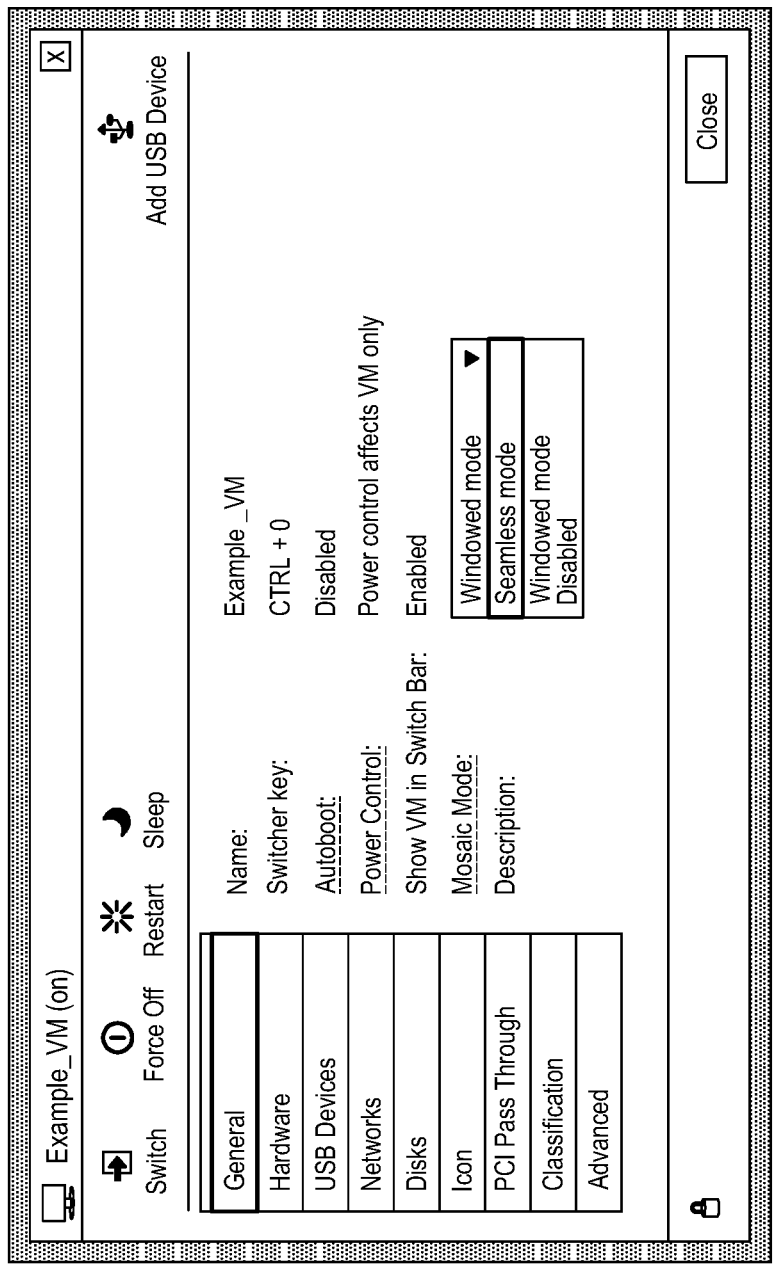
FIG. 10 depicts an example virtual machine participation user interface in accordance with aspects described herein.

Whether a particular VM participates in Mosaic as a seamless or windowed participant is configured from within a VM details pane for that particular VM when the composite desktop is enabled. An example virtual machine participation user interface is shown in FIG. 10, where, for the "Example VM", the Mosaic Mode setting is set to Seamless Mode, and other options are set as shown. Displays that are not assigned to the Mosaic desktop may be available for pinned mode to pin that VM's interface to a particular display. Assigning a VM as pinned removes it from participating in the Mosaic composite desktop.

Figure 11:
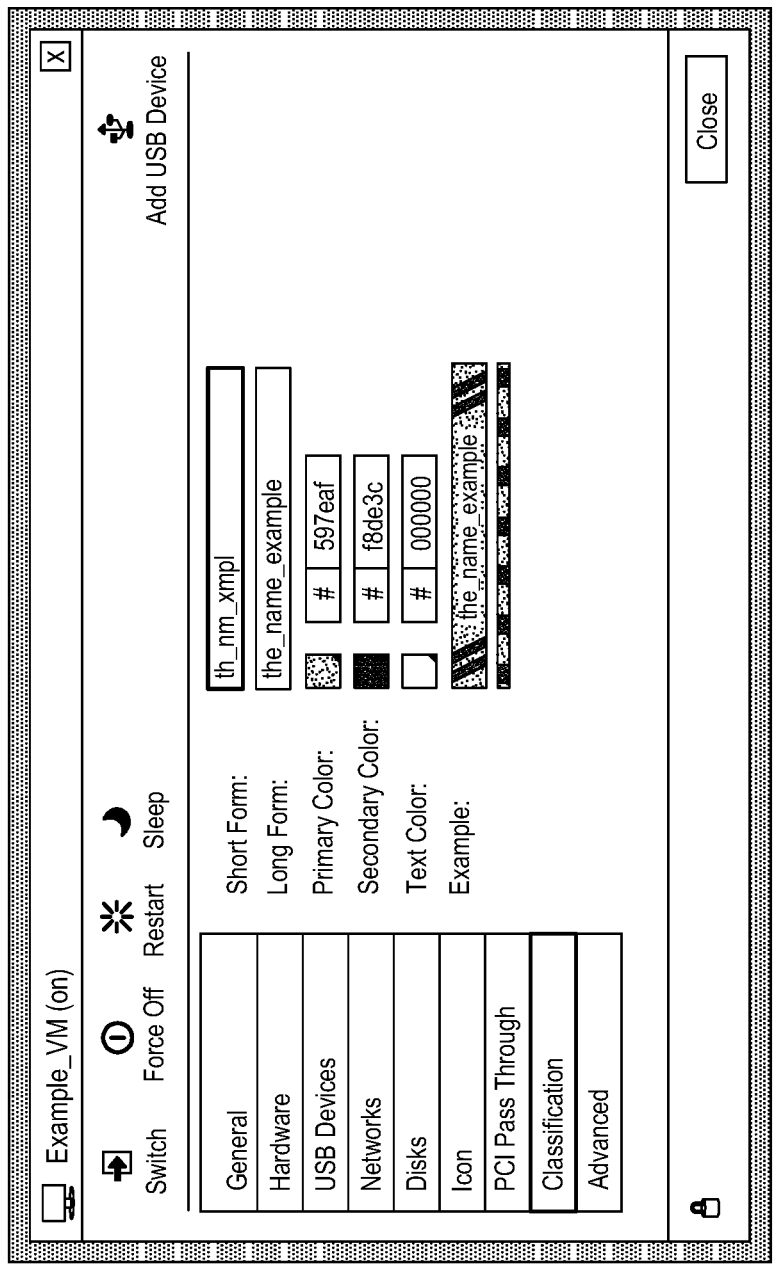
FIG. 11 depicts an example virtual machine classification configuration user interface in accordance with aspects described herein.

FIG. 11 depicts an example virtual machine classification configuration user interface in accordance with aspects described herein. The user can set short and long form names of the VM, primary, and select from a pop-up color palate (not shown) secondary, and text colors for the borders/other 'decorations' to show in the graphical interface to distinguish VMs. In some embodiments, these fields are read-only when the workstation is remotely managed or when the workstation undergoes a lockdown.

Figure 12:
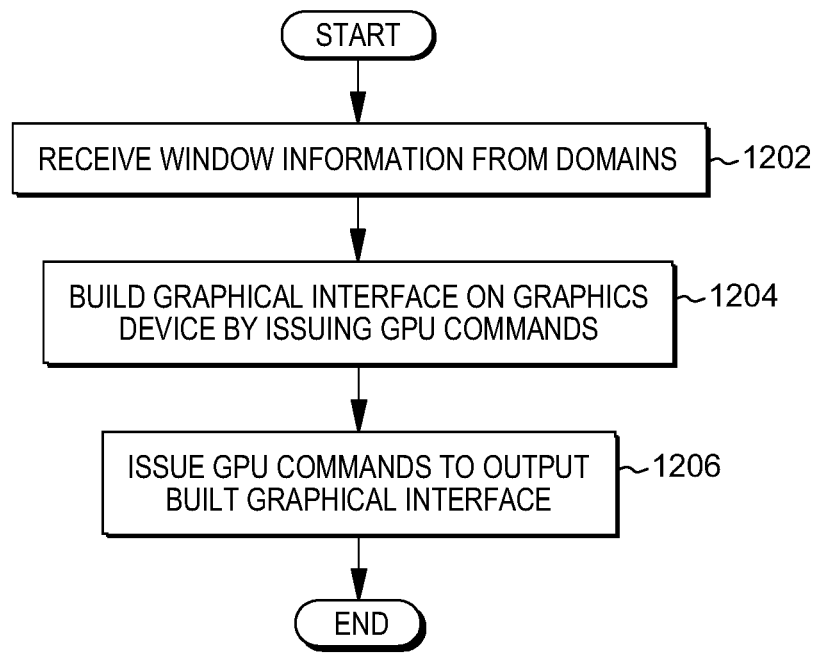
FIG. 12 depicts an example process of providing a graphical interface for a computer system, in accordance with aspects described herein.

FIG. 12 depicts an example process of providing a graphical interface for a computer system, in accordance with aspects described herein. In some examples, the process is performed by a computer system that runs the domain VMs, incorporates the graphics device, and is in communication with the set of display devices. More particularly, the process can be performed by software executing in a display domain VM executing above a hypervisor of the computer system, as an example.

The process includes receiving window information from each domain of multiple domains in which applications execute (1202). The multiple domains execute as separate execution environments, for instance virtual machines, for executing their respective applications. The window information from each domain informs of window position and size for a respective one or more applications executing in the domain.

Based at least on the received window information, the process continues by building the graphical interface on the graphics device of the computer system (1204). The graphical interface is built at least in part from graphics data provided from one or more of the multiple domains to the graphics device. In this regard, the graphical interface can include no only graphics data from some or all of the multiple domains but also additional graphics elements, such as window borders, that Mosaic places in the graphical interface.

The graphics device includes a graphics processing unit and graphics memory having multiple graphics memory portions, and each domain of the multiple domains is dedicated a respective different graphics memory portion of the multiple graphics memory portions and is given write access thereto. The building of the interface includes issuing commands to the graphics device that instruct the graphics processing unit to composition together at least some graphics data from each of two or more graphics memory portions of the multiple graphics memory portions, to thereby composition together graphics data from each of two of more domains of the multiple domains. Example graphics devices include a graphics card (sometimes referred to as video card or "GPU").

The at least some graphics data from each domain of the two or more domains can include graphical user interface (GUI) windows of applications executing on the domain. The built graphics interface can include a collection of these GUI windows from the two of more domains, e.g. GUI windows from multiple domains, as well as additional graphics data from an in-focus domain, such as at least a portion of at least one desktop background of a desktop of a domain of the two or more domains, and a taskbar of the domain of the two or more domains. Additionally, graphics data may be added as part of the building to graphically correlate which GUI windows of the collection of GUI windows are from which domains of the two or more domains. For instance, borders can be added around each window from each of the domains to indicate which domain a given window is taken from.

In cases where the at least two domains from which graphics data is compositioned into the graphical interface includes three or more domains, the set of one or more display devices can include a first display device and a group or two or more display devices, and the display mode configurations for the domains could dictate that the commands build the graphical interface to produce a first graphics output, to the first display device, that includes graphics data from a first domain of the at least three domains, and a second graphics output, to the group of two or more display devices, that includes graphics data from second and third domains of the at least three domains.

As noted, the receiving (1202) and the building (1204) may be performed by a display domain that executes as another execution environment separate from the execution environments of the multiple domains (i.e. in different VMs). The display domain may also be dedicated a graphics memory portion of the graphics device memory. Each domain of the multiple domains may have write access only to its dedicated memory portion(s), i.e. may be restricted from writing data to every graphics memory portion, of the multiple graphics memory portions, that is other than the graphics memory portion dedicated to the domain.

In some examples, the commands issued as part of the building are issued by the display domain and instruct the graphics processing unit to copy the at least some graphics data from the two or more graphics memory portions to the graphics memory portion dedicated to the display domain and arrange the at least some graphics data based on the received window information. This copying provides the graphical interface in the graphics memory portion dedicated to the display domain, and the graphical interface may be rendered for output to the set of one or more display devices from that graphics memory portion that is dedicated to the display domain.

Each of the multiple graphics memory portions can include a texture memory. The graphics data provided from each domain of the multiple domains to the graphics device can therefore include texture data provided to the texture memory of the graphics memory portion dedicated to the domain. The copied at least some graphics data may therefore be texture data copied from the texture memories of the two or more graphics memory portions to a texture memory of the graphics memory portion dedicated to the display domain. The graphical interface can include texture data rendered from the texture memory of the graphics memory portion dedicated to the display domain.

Building the graphics interface can further include the display domain accessing, with read-only access, the texture memories of the two or more graphics memory portions, for instance to pull the guest graphics data as a source for the compositioning operations.

Since the graphics data from the multiple domains is provided to the graphics device and compositioned as desired right on the graphics device, that graphics data may be provided to the graphics device absent/without the multiple domains providing that graphics data to the display domain. In other words, the display domain may not receive any of that graphics data, yet may still composition it together via issued commands as desired on the graphics device for output.

Returning to the FIG. 12, the process continues by issuing commands to the graphics device to output the built graphical interface to a set of one or more display devices (1206).

Additionally or alternatively, the building of the graphics interface may be in accordance with a fingerprint for the one or more display devices. The fingerprint may be collected information that identifies a configuration of respective portions of the graphical interface to display on each display device of the one or more display devices. In other words, the fingerprint serves as a unique identifier of the display mode configuration(s) to apply to each of the display devices. The output of the graphical interface to the set of one or more display devices outputs, to each display device of the one or more display devices, a respective graphics output that corresponds to the portion of the graphical interface to display on that display as indicated by the configuration identified by the fingerprint. Thus, the process might fingerprint a particular setup when a user connects a laptop to an external monitor and selects a cloned mode across both the laptop display and external monitor. The fingerprint may be stored along with an indication of the cloned mode for both displays. Subsequently, when the user reconnects the external monitor, the system obtains the environment fingerprint, recognizes a match to the stored fingerprint and the indication of the cloned mode, and automatically enters the cloned mode to clone the desktop across both displays.

Although various examples are provided, variations are possible without departing from a spirit of the claimed aspects.

Figure 13:
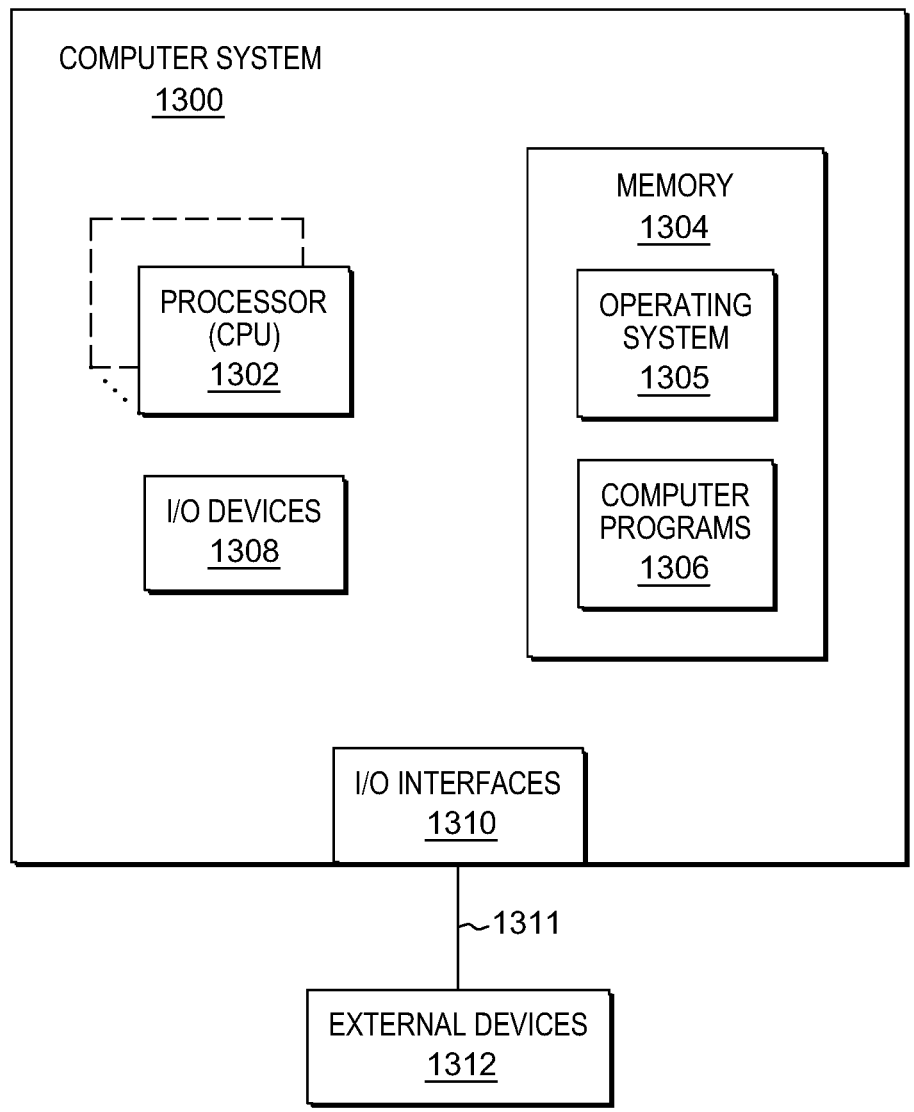
FIG. 13 depicts one example of a computer system and associated devices to incorporate and/or use aspects described herein.

Processes described herein may be performed singly or collectively by one or more computer systems. FIG. 13 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, Calif., USA) or ARM Holdings plc (Cambridge, England, United Kingdom), as examples.

FIG. 13 shows a computer system 1300 in communication with external device(s) 1312. Computer system 1300 includes one or more processor(s) 1302, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1302 can also include register(s) to be used by one or more of the functional components. Computer system 1300 also includes memory 1304, input/output (I/O) devices 1308, and I/O interfaces 1310, which may be coupled to processor(s) 1302 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1304 can be or include main or system memory (e.g. Random Access Memory) used in the execution of program instructions, storage device(s) such as hard drive(s), flash media, or optical media as examples, and/or cache memory, as examples. Memory 1304 can include, for instance, a cache, such as a shared cache, which may be coupled to local caches (examples include L1 cache, L2 cache, etc.) of processor(s) 1302. Additionally, memory 1304 may be or include at least one computer program product having a set (e.g., at least one) of program modules, instructions, code or the like that is/are configured to carry out functions of embodiments described herein when executed by one or more processors.

Memory 1304 can store an operating system 1305 and other computer programs 1306, such as one or more computer programs/applications that execute to perform aspects described herein. Specifically, programs/applications can include computer readable program instructions that may be configured to carry out functions of embodiments of aspects described herein.

Examples of I/O devices 1308 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1312) coupled to the computer system through one or more I/O interfaces 1310.

Computer system 1300 may communicate with one or more external devices 1312 via one or more I/O interfaces 1310. Example external devices include a keyboard, a pointing device, display(s), and/or any other devices that enable a user to interact with computer system 1300. Other example external devices include any device that enables computer system 1300 to communicate with one or more other computing systems or peripheral devices such as a printer. A network interface/adapter is an example I/O interface that enables computer system 1300 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.). In another example, an I/O interface is a graphics device ("GPU" card) configured in accordance with aspects described herein.

The communication between I/O interfaces 1310 and external devices 1312 can occur across wired and/or wireless communications link(s) 1311, such as Ethernet-based wired or wireless connections. Example wireless connections include cellular, Wi-Fi, Bluetooth®, proximity-based, near-field, or other types of wireless connections. More generally, communications link(s) 1311 may be any appropriate wireless and/or wired communication link(s) for communicating data.

Particular external device(s) 1312 may include one or more data storage devices, which may store one or more programs, one or more computer readable program instructions, and/or data, etc. Computer system 1300 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1300 may be operational with numerous other general purpose or special purpose computing system environments or configurations. Computer system 1300 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

The present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of providing a graphical interface for a computer system, the method comprising:
   receiving window information from each domain of multiple domains in which applications execute, the multiple domains executing as separate execution environments for executing their respective applications, the window information from each domain informing of window position and size for a respective one or more applications executing in the domain;
   based at least on the received window information, building the graphical interface on a graphics device of the computer system from graphics data provided from the multiple domains to the graphics device, the graphics device comprising a graphics processing unit and graphics memory having multiple graphics memory portions, wherein each domain of the multiple domains is dedicated a respective different graphics memory portion of the multiple graphics memory portions and is given write access thereto, wherein the building comprises issuing commands to the graphics device that instruct the graphics processing unit to composition together at least some graphics data from each of two or more graphics memory portions of the multiple graphics memory portions to thereby composition together graphics data from each of two of more domains of the multiple domains, wherein the receiving and the building are performed by a display domain executing as another execution environment separate from the execution environments of the multiple domains, wherein the display domain is also dedicated a graphics memory portion of the graphics device memory, and wherein each domain of the multiple domains is restricted from writing data to every graphics memory portion, of the multiple graphics memory portions, that is other than the graphics memory portion dedicated to the domain; and
   issuing commands to the graphics device to output the graphical interface to a set of one or more display devices.

2. The method of claim 1, wherein the commands issued as part of the building are issued by the display domain and instruct the graphics processing unit to copy the at least some graphics data from the two or more graphics memory portions to the graphics memory portion dedicated to the display domain and arrange the at least some graphics data based on the received window information, the copying providing the graphical interface in the graphics memory portion dedicated to the display domain, and wherein the graphical interface is rendered for output to the set of one or more display devices from the graphics memory portion dedicated to the display domain.

3. The method of claim 2, wherein each of the multiple graphics memory portions comprises a texture memory, wherein the graphics data provided from each domain of the multiple domains to the graphics device comprises texture data provided to the texture memory of the graphics memory portion dedicated to the domain, wherein the copied at least some graphics data is texture data copied from the texture memories of the two or more graphics memory portions to a texture memory of the graphics memory portion dedicated to the display domain, and wherein the graphical interface comprises the texture data rendered from the texture memory of the graphics memory portion dedicated to the display domain.

4. The method of claim 3, wherein the building the graphics interface further comprises the display domain accessing, with read-only access, the texture memories of the two or more graphics memory portions.

5. The method of claim 1, wherein the graphics data provided from the multiple domains to the graphics device is provided absent the multiple domains providing that graphics data to the display domain.

6. The method of claim 1, wherein the graphics device is a single graphics card of the computer system.

7. The method of claim 1, wherein the at least some graphics data from each domain of the two or more domains comprises graphical user interface (GUI) windows of applications executing on the domain, and wherein the built graphics interface comprises a collection of GUI windows from the two of more domains, at least a portion of at least one desktop background of a desktop of a domain of the two or more domains, a taskbar of the domain of the two or more domains, and added graphics data added by the building to graphically correlate which GUI windows of the collection of GUI windows are from which domains of the two or more domains.

8. The method of claim 1, wherein the at least two domains comprise at least three domains, wherein the set of one or more display devices comprises a first display device and a group or two or more display devices, and wherein the commands build the graphical interface to produce a first graphics output, to the first display device, comprising graphics data from a first domain of the at least three domains, and a second graphics output, to the group of two or more display devices, comprising graphics data from second and third domains of the at least three domains.

9. The method of claim 1, wherein the building is in accordance with a fingerprint for the one or more display devices, the fingerprint identifying a configuration of respective portions of the graphical interface to display on each display device of the one or more display devices, wherein the output of the graphical interface to the set of one or more display devices outputs, to each display device of the one or more display devices, a respective graphics output that corresponds to the portion of the graphical interface to display on that display as indicated by the configuration identified by the fingerprint.

10. A computer system configured to perform a method of providing a graphical interface, the method comprising:
   receiving window information from each domain of multiple domains in which applications execute, the multiple domains executing as separate execution environments for executing their respective applications, the window information from each domain informing of window position and size for a respective one or more applications executing in the domain;
   based at least on the received window information, building the graphical interface on a graphics device of the computer system from graphics data provided from the multiple domains to the graphics device, the graphics device comprising a graphics processing unit and graphics memory having multiple graphics memory portions, wherein each domain of the multiple domains is dedicated a respective different graphics memory portion of the multiple graphics memory portions and is given write access thereto, wherein the building comprises issuing commands to the graphics device that instruct the graphics processing unit to composition together at least some graphics data from each of two or more graphics memory portions of the multiple graphics memory portions to thereby composition together graphics data from each of two of more domains of the multiple domains, wherein the receiving and the building are performed by a display domain executing as another execution environment separate from the execution environments of the multiple domains, wherein the display domain is also dedicated a graphics memory portion of the graphics device memory, and wherein each domain of the multiple domains is restricted from writing data to every graphics memory portion, of the multiple graphics memory portions, that is other than the graphics memory portion dedicated to the domain; and issuing commands to the graphics device to output the graphical interface to a set of one or more display devices.

11. The computer system of claim 10, wherein the commands issued as part of the building are issued by the display domain and instruct the graphics processing unit to copy the at least some graphics data from the two or more graphics memory portions to the graphics memory portion dedicated to the display domain and arrange the at least some graphics data based on the received window information, the copying providing the graphical interface in the graphics memory portion dedicated to the display domain, and wherein the graphical interface is rendered for output to the set of one or more display devices from the graphics memory portion dedicated to the display domain.

12. The computer system of claim 11, wherein each of the multiple graphics memory portions comprises a texture memory, wherein the graphics data provided from each domain of the multiple domains to the graphics device comprises texture data provided to the texture memory of the graphics memory portion dedicated to the domain, wherein the copied at least some graphics data is texture data copied from the texture memories of the two or more graphics memory portions to a texture memory of the graphics memory portion dedicated to the display domain, wherein the graphical interface comprises the texture data rendered from the texture memory of the graphics memory portion dedicated to the display domain, and wherein the building the graphics interface further comprises the display domain accessing, with read-only access, the texture memories of the two or more graphics memory portions.

13. The computer system of claim 10, wherein the at least two domains comprise at least three domains, wherein the set of one or more display devices comprises a first display device and a group or two or more display devices, and wherein the commands build the graphical interface to produce a first graphics output, to the first display device, comprising graphics data from a first domain of the at least three domains, and a second graphics output, to the group of two or more display devices, comprising graphics data from second and third domains of the at least three domains.

14. The computer system of claim 10, wherein the building is in accordance with a fingerprint for the one or more display devices, the fingerprint identifying a configuration of respective portions of the graphical interface to display on each display device of the one or more display devices, wherein the output of the graphical interface to the set of one or more display devices outputs, to each display device of the one or more display devices, a respective graphics output that corresponds to the portion of the graphical interface to display on that display as indicated by the configuration identified by the fingerprint.

15. A computer program product comprising:
a non-transitory computer readable storage medium storing instructions for execution to perform a method of providing a graphical interface for a computer system, the method comprising:
receiving window information from each domain of multiple domains in which applications execute, the multiple domains executing as separate execution environments for executing their respective applications, the window information from each domain informing of window position and size for a respective one or more applications executing in the domain;
based at least on the received window information, building the graphical interface on a graphics device of the computer system from graphics data provided from the multiple domains to the graphics device, the graphics device comprising a graphics processing unit and graphics memory having multiple graphics memory portions, wherein each domain of the multiple domains is dedicated a respective different graphics memory portion of the multiple graphics memory portions and is given write access thereto, wherein the building comprises issuing commands to the graphics device that instruct the graphics processing unit to composition together at least some graphics data from each of two or more graphics memory portions of the multiple graphics memory portions to thereby composition together graphics data from each of two of more domains of the multiple domains, wherein the receiving and the building are performed by a display domain executing as another execution environment separate from the execution environments of the multiple domains, wherein the display domain is also dedicated a graphics memory portion of the graphics device memory, and wherein each domain of the multiple domains is restricted from writing data to every graphics memory portion, of the multiple graphics memory portions, that is other than the graphics memory portion dedicated to the domain; and
issuing commands to the graphics device to output the graphical interface to a set of one or more display devices.

16. The computer program product of claim 15, wherein the commands issued as part of the building are issued by the display domain and instruct the graphics processing unit to copy the at least some graphics data from the two or more graphics memory portions to the graphics memory portion dedicated to the display domain and arrange the at least some graphics data based on the received window information, the copying providing the graphical interface in the graphics memory portion dedicated to the display domain, and wherein the graphical interface is rendered for output to the set of one or more display devices from the graphics memory portion dedicated to the display domain.

17. The computer program product of claim 16, wherein each of the multiple graphics memory portions comprises a texture memory, wherein the graphics data provided from each domain of the multiple domains to the graphics device comprises texture data provided to the texture memory of the graphics memory portion dedicated to the domain, wherein the copied at least some graphics data is texture data copied from the texture memories of the two or more graphics memory portions to a texture memory of the graphics memory portion dedicated to the display domain, wherein the graphical interface comprises the texture data rendered from the texture memory of the graphics memory portion dedicated to the display domain, and wherein the building the graphics interface further comprises the display domain accessing, with read-only access, the texture memories of the two or more graphics memory portions.

18. The computer program product of claim 15, wherein the at least two domains comprise at least three domains, wherein the set of one or more display devices comprises a first display device and a group or two or more display devices, and wherein the commands build the graphical interface to produce a first graphics output, to the first display device, comprising graphics data from a first domain of the at least three domains, and a second graphics output, to the group of two or more display devices, comprising graphics data from second and third domains of the at least three domains.

19. The computer program product of claim 15, wherein the building is in accordance with a fingerprint for the one or more display devices, the fingerprint identifying a configuration of respective portions of the graphical interface to display on each display device of the one or more display devices, wherein the output of the graphical interface to the set of one or more display devices outputs, to each display device of the one or more display devices, a respective graphics output that corresponds to the portion of the graphical interface to display on that display as indicated by the configuration identified by the fingerprint.

* * * * *